MULTIPLEX DIGITAL COMMUNICATION SYSTEM

Filed Oct. 5, 1964

2 Sheets-Sheet 1

INVENTOR.
WILLIAM S. LITCHMAN
BY Philip M. Bolton
ATTORNEY

INVENTOR.
WILLIAM S. LITCHMAN
BY Philip M. Bolton
ATTORNEY

United States Patent Office 3,337,691

Patented Aug. 22, 1967

3,337,691

MULTIPLEX DIGITAL COMMUNICATION SYSTEM

William S. Litchman, New York, N.Y., assignor to International Telephone and Telegraph Corporation, Nutley, N.J., a corporation of Maryland Filed Oct. 5, 1964, Ser. No. 401,529
8 Claims. (Cl. 179—15)

ABSTRACT OF THE DISCLOSURE $m$ information signals, certain ones of which are multichannel signals, are translated to $n$ time coincident stream of binary bits, where both $m$ and $n$ are integers greater than one with $n$ being less than $m$. The bits of each stream have a different weighted value. Time coincident bits, one from each stream, are converted to an output pulse having a quantized amplitude corresponding to the binary states and weighted value of the bits to produce a train of output pulses. The output pulses phase modulate a carrier for transmission over a cable. The modulated carrier is detected to recover the train of pulses from which the bit streams are reconstituted.

This invention relates to a multiplex communication system, and has particular application to the transmission of large amounts of digital information over a transmission medium of limited bandwidth.

In order to meet the existing and emerging large scale demand for information traffic, many transmission media of limited bandwidth not originally designed for the handling of large amounts of digital information are being considered for such possible use. However, because of the characteristics of such transmission media, such as, for example, transoceanic cables, ordinary multiplexing techniques (such as frequency division multiplexing) are not satisfactory or do not make adequate use of the characteristics of such transmission media.

An object of the present invention is the provision of a multiplex communication system which is adapted to efficiently and economically use transmission media of limited bandwidth.

A more specific object of the present invention is the provision of such a multiplex system which is particularly adapted to use existing cables, such as submarine cables, and/or known cable technology.

A feature of the present invention is the provision of a multiplex transmission system in which there is provided a plurality of streams of information bits, and in which sets of corresponding bits, each set consisting of one bit from each stream, are translated into amplitude quantized pulses, the amplitude of the pulses varying, in accordance with a predetermined code, in correspondence with the binary status of the bits of each set, to thereby form a single train of pulses of varying quantized amplitude, this train being used in effecting transmission over a communication medium of limited bandwidth.

According to a further feature of the present invention, at least one of the bit streams is a time division multiplex stream derived from a plurality of information sources.

According to a still further aspect of the present invention, the varying quantized amplitude pulse train is applied to phase shift a carrier, the phase shifted carrier being applied to a suitable transmission means, such as, for example, a submarine cable.

According to still another aspect of the present invention, the signals thus received over the transmission medium are translated back into the form of the varying quantized amplitude pulse train which, in turn, is used to reconstitute the plurality of information bit streams.

The above-mentioned and other features and objects of the present invention will become more apparent by reference to the following description of an embodiment thereof taken in conjunction with the accompanying drawings, in which.

Generally describing the system depicted in the figures, there is illustrated a West terminal and an East terminal of a communication system utilizing a transoceanic submarine cable with suitable repeaters. Since the two terminals are similar, a description of the West terminal should suffice for both.

Signals from different sources which may be remote from the West terminal are fed to said terminal preferably through a central switching system which provides for maximum utilization of the communication channels provided by said terminal by switching signals from busy channels to unoccupied channels in accordance with the demand for and availability of channels. The switch also determines the class of traffic e.g. speech, DC teletype and modulated data. These signals are then, where necessary, buffered, and their format is translated according to known techniques so as to provide a plurality of what may be considered as single channels of common binary format, although the repetition rate of the bits may differ and obviously the content of the channels would differ. These are then fed to a time division multiplexer. The so-designated single channels actually may consist of two or more low bit rate channels combined into a single channel.

In the time division multiplexer, groups of these single channels are combined to each form a multiplex stream of bits so that the output of the multiplexer consists of a plurality of such streams of multichannel bits. In the specific embodiment described, there are three such streams. These three binary streams are translated into a train of quantized amplitude modulated pulses. The train of amplitude modulated pulses is then used to phase shift a carrier, which is then transmitted over the cables and repeaters to the opposite terminal. The receiver for each terminal accepts the phase shifted carrier and demodulates the phase shifted carrier to reconstitute the quantized amplitude modulated pulse train. This is then decoded to reproduce the streams of multichannel bits (in the given example, there are three such streams) and, in turn, these three streams are distributed to provide the original so-called single channel outputs which are fed to suitable utilization devices either directly or via trunk lines, cables, and other communication media.

Figure 1:
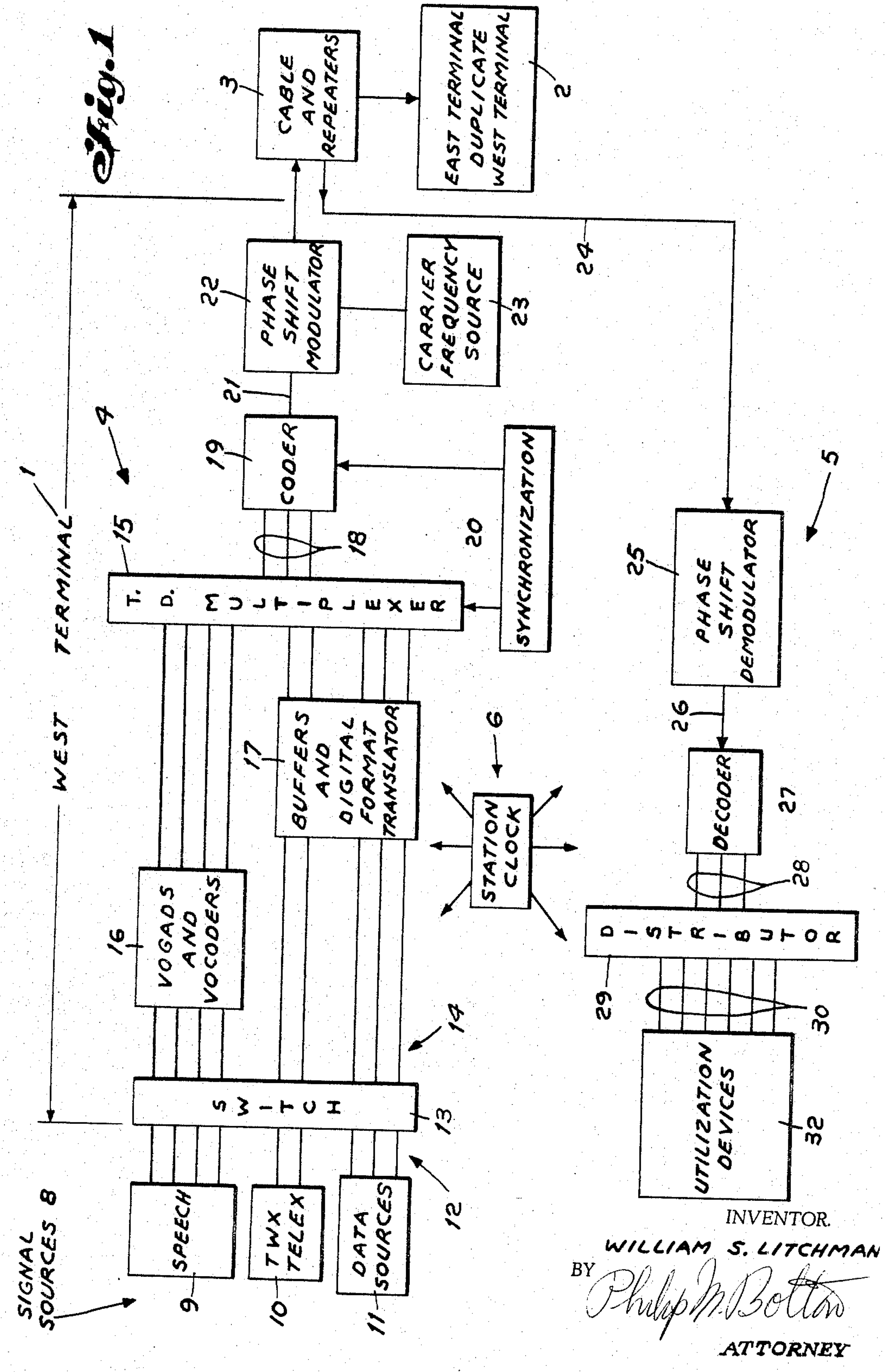
FIG. 1 is a block diagram of a multiplex communication system using a cable as a transmission medium.

Referring now specifically to the drawings, and particularly to FIG. 1, the system there shown consists of a West terminal 1, an East terminal 2, and the cable 3, which includes the necessary repeaters, etc. This cable may be, for example, one of the submarine cables of the transoceanic type, such as the British Commonwealth Cable, CANTAT, using rigid repeaters with filters to achieve bidirectional transmission and provided with armored shore ends, which type of cables appear to represent a present trend in transoceanic cables.

Since the West and East terminals are similar, a description of the West terminal here is given. The West terminal consists of a transmission system 4 and a receiving system 5, using a common station clock 6 for providing the synchronization clock pulses for both. To the input of the West terminal are fed signals from a plurality of signal sources generally designated as 8. These may consist of speech sources 9, TWX and TELEX sources 10, and other data sources 11, which may include computers, etc. These are preferably fed over suitable lines 12 to a switching facility 13, which may include suitable buffering, store and forward facilities, as well as other conventional switching to provide for maximum use of the terminal channels, for example, by feeding signals from a crowded line through unused or available channels. The outputs of the switching facility 13 are fed over a plurality of single channel lines 14 to a time division multiplexer 15. In order to be able to combine these channels in the time division multiplexer, the signals in the input of each of the lines is treated as typified by devices 16 and 17. For example, for the speech signals, the device 16 would consist of vogads and vocoders, which translate the speech signals into trains of binary signals, which are then transmitted to the multiplexer 15. For TWX and TELEX signals and where necessary for signals from other data sources, the device 17 would include buffers and where necessary translators for changing the digital format to correspond with the format of the bit trains of the speech signals. The time division multiplexer, which could consist actually of three separate multiplexers, combines groups of these binary trains into streams of time division multichannel bits. In the specific example here given, there would be three such streams, designated in FIG. 2 as streams A, B, and C. These three streams are fed from the multiplexer 15 over three separate lines 18 to a coder 19.

In the coder 19 the three streams are translated as will be more fully described in connection with FIG. 2 into a single train of quantized amplitude modulated pulses. This translation is done according to a predetermined code which may be for example the simple arithmetical binary code. Synchronization of the multiplexer and the coder may be accomplished by a suitable synchronization arrangement 20 under control of clock pulses derived from the station clock 6. The train of amplitude modulated pulses from the coder are fed over a line 21 to a phase shift modulator 22 in which modulator a carrier signal from a carrier signal source 23 is phase shifted in accordance with the amplitude of each pulse of the train. Since the pulses have eight quantized levels, these could be used to phase shift the carrier by amounts which differ according to the relative difference between two successive amplitude levels. A relative difference of one amplitude level between two successive pulses would represent a 45° phase shifting, the total phase shift thus produced varying from 0 degree to 315 degrees. The phase shifted carrier is then transmitted over cable 3.

The receiver for the West terminal, which is similar to the receiver for the East terminal, receives the phase shifted carrier signals from the cable 3 over, for example, a line 24, and applies them to a phase shift demodulator 25 which thereby reproduces the quantized amplitude modulated pulse train. This train is fed over line 26 to a decoder 27, which has the inverse function of the coder 19 and translates the amplitude modulated pulse train to reproduce the three streams of multichannel bits designated A, B, and C in FIG. 2. These three streams are then fed over three lines 28 to a distributor 29 where they are each separated into a plurality of individual channels which are, in turn, fed over lines 30 to suitable utilization devices 32. The utilization devices 32 may consist of switching facilities or trunk lines, transducers, computers, etc.

Figure 2:
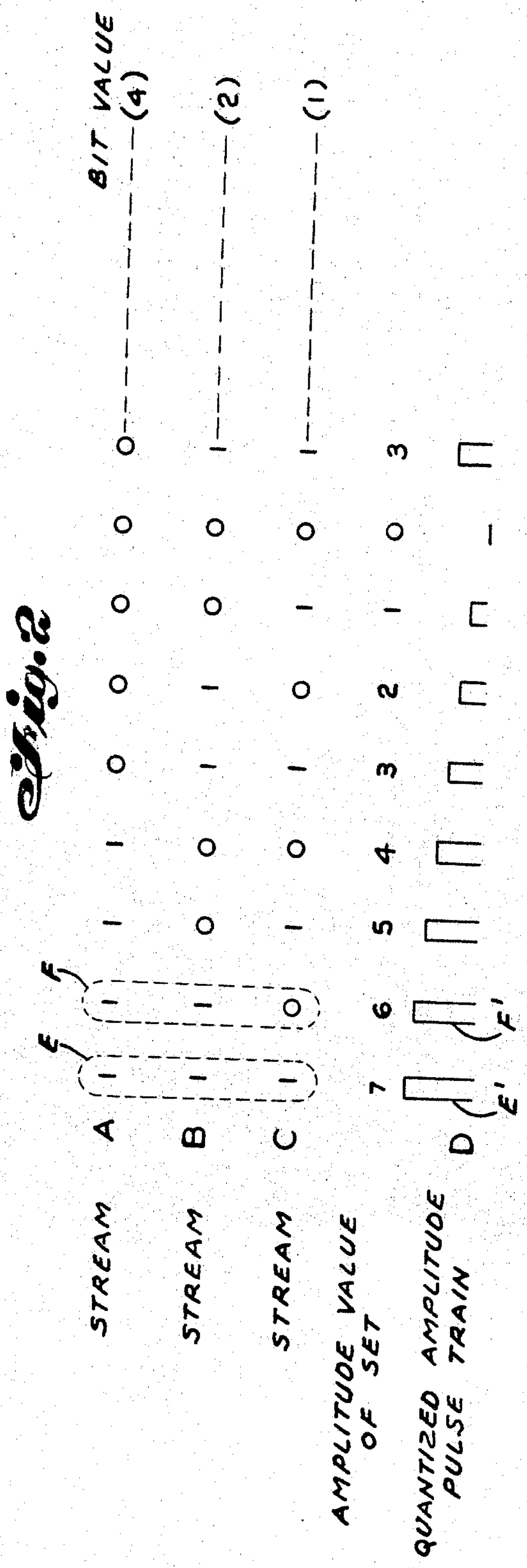
FIG. 2 is a chart used to explain the coding operation described with respect to FIG. 1.
Figure 3:
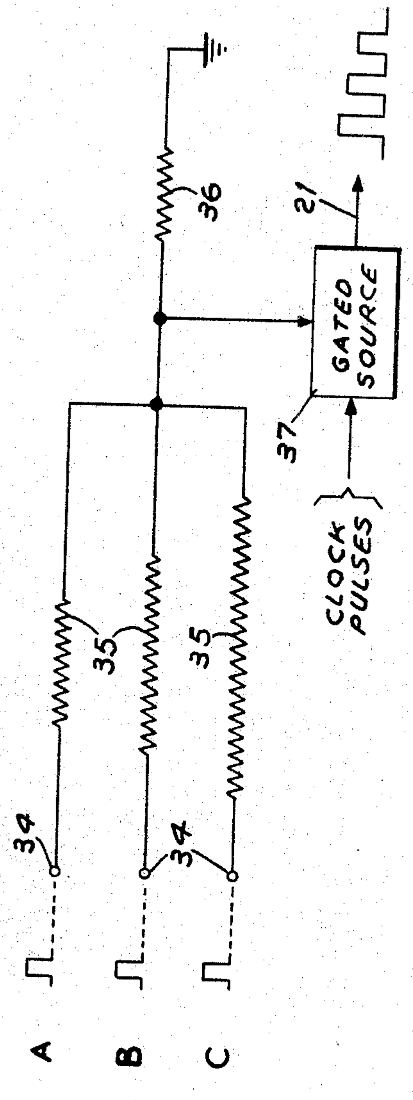
FIG. 3 is a schematic diagram of a coder for producing the coding described.

While the various devices hereinbefore described are generally well known, some additional description is believed desirable of the coder 19 and the manner in which the three streams of multichannel bits are translated into a single quantized amplitude modulated pulse train.This coding scheme can be best appreciated by referring to FIGS. 2 and 3. Referring now to FIG. 2, and assuming for the sake of illustration that the three streams which we designate as A, B, and C consist of bits whose values are 1's and 0's as illustrated, we may, by a suitable code, translate these bits into the quantized amplitude pulse train D. We treat the time-corresponding bits of the three streams as a code group or set representing a given numerical value. Let us assume that the code we use is a simple arithmetical binary code in which the bit values for stream A are 4, stream B, 2, and stream C, 1 units. This first set E of bits consisting of the first bit of each stream would, under the conditions specified, have a value of 7 units, and accordingly, the quantized amplitude pulse corresponding to this set would be the pulse E' and would be a pulse of maximum value. Taking the second bit of each stream and using the same code scheme and values, the amplitude value of this set, which we have designated as set F, would have a value of 6 units, and the corresponding pulse F' would have a corresponding amplitude which would, of course, be less than that of pulse E'. It will be seen that the amplitude of each pulse would vary with the binary status of each of the bits of the corresponding set. Considering the number of permutations possible in each set with the varying of the value of the bits between binary 1 and binary 0, in the given example where we have three bits to each set the number of corresponding quantized amplitude levels would be eight amplitude levels, with each level being unique for a given permutation of the binary status of the bits of each set. The rest of the coding scheme is obvious from the chart shown in FIG. 2.

Various schemes may be used for such type of coding. One such scheme is illustrated in FIG. 3 and is essentially the arrangement shown in U.S. Patent No. 2,807,-715, dated Sept. 24, 1957, and issued to A. Lesti, except that the delay line in said patent, which is used to change serial input code pulses into parallel input pulses, is not necessary since the bits forming each code signal here are a set of parallel bits. The three bits of a set are applied simultaneously as shown in FIG. 3, to the three input points 34 of a group of resistors 35 forming with resistor 36 a voltage divider arrangement. The resistors 35 have different values so as to attenuate the input pulse bits by different amounts in accordance with the bit value assigned to each stream, as illustrated in FIG. 2, so that the pulses from stream A are least attenuated, while those from stream C are the most attenuated. The junction point of the resistors 35 is fed to a gating circuit 37, which is periodically opened by clock pulses from the station clock 6 to allow the resulting quantized amplitude modulated pulses to be transmitted over line 21 as a quantized amplitude modulated pulse train.

The various other components are conventional. Thus, various types of phase shifters may be employed which respond to the quantized amplitude pulses. The difference in the amount of phase shift produced by adjacent levels of the quantized amplitude modulated may be less than 45 degrees or more than 45 degrees, depending upon the number of such levels. Thus, for example, if there were only four amplitude levels involved, each level could differ by 90 degrees in phase shifting effectiveness.

The decoder 27 could be any coder producing a parallel code pulse output, such as some of the cathode ray tube type of coders which translate an amplitude modulator signal into a binary code signal utilizing a coding mask or shield. Alternatively, the usual serial coder can be used and then the resulting serial pulses can be regrouped by a serial-to-parallel converter into parallel form. It is also obvious that a portion of one of the channels may be used for synchronizing the clocks of the West and East terminals.

While I have described above the principles of my inveniton in connection with specific apparatus, it is to be clearly understood that this description is made only by way of example and not as a limitation to the scope of my invention as set forth in the objects thereof and in the accompanying claims.

I claim:

1. A multiplex digital transmission system comprising a source of a plurality of time coincident streams of binary information bits, means responsive to each set of time coincident bits, one bit from each of said streams to produce an output pulse having a quantized amplitude corresponding to the binary states of the bits of each of said sets, to thereby produce a train of said output pulses, a communication medium, and means responsive to said train of pulses for transmitting information signals related to the amplitude of each pulse of said train of pulses over said communication medium.

2. A multiplex digital communication system including a multiplex digital transmission system according to claim 1 further including a receiver comprising means coupled to said communication medium and responsive to the information signals to reconstitute said train of amplitude pulses, and means responsive to said reconstituted train for reproducing said plurality of bit streams.

3. A multiplex digital transmission system comprising a source of a plurality of time coincident streams of multichannel binary information bits, means responsive to each set of time coincident bits, one bit from each of said streams, to produce an output pulse having a quantized amplitude corresponding to and unique for each permutation of the binary states of the bits of each of said sets, in accordance with a predetermined code, to thereby produce a single train of said output pulses, a communication medium, and means responsive to said train of pulses for transmitting information signals related to the amplitude of each pulse of said train of pulses over said communication medium.

4. A multiplex digital transmission system comprising a source of a plurality of streams of information bits, means responsive to a set of corresponding bits, one bit from each of said streams, to produce an output pulse having a quantized amplitude corresponding to the binary states of the bits of each of said sets, to thereby produce a train of such pulses of quantized amplitude, a communication means, and means responsive to said train of pulses for transmitting information signals over said communication medium said last mentioned means including means for phase shifting a carrier frequency signal in accordance with the amplitude of each of said pulses, and means for feeding said phase shifted carrier signal to said communication medium.

5. A multiplex digital transmission system according to claim 4 in which said communication medium is a cable.

6. A multiplex digital communication system comprising a multiplex digital transmission system according to claim 4, further including a receiver having means for receiving said phase-shifted carrier signals, means responsive to said phase-shifted carrier signals for reconstituting said train of quantized amplitude pulses, and means responsive to said reconstituted train of pulses for reproducing said plurality of streams of information bits.

7. A multiplex digital transmission system comprising a plurality of sources of information signals, means coupled to said sources for translating said signals into a plurality of time coincident streams of binary information bits, at least one of said streams being a multichannel stream, means responsive to each set of time coincident bits, one bit from each of said streams, to produce an output pulse having a quantized amplitude corresponding to and unique for each permutation of the binary states of the bits of each of said sets, in accordance with a predetermined code, to thereby produce a single train of said output pulses, a communication medium, and means responsive to said train of pulses for transmitting information signals related to the amplitude of each pulse of said train of pulses over said communication medium.

8. A multiplex digital transmission system comprising a source of a plurality of time coincident streams of binary information bits the bits of each of said streams having a different predetermined weighted value, means responsive to each set of time coincident bits, one bit from each of said streams, to produce an output pulse having a quantized amplitude corresponding to the binary state and weighted values of the bits of each of said sets, to thereby produce a train of said output pulses, a communication medium, and means responsive to said train of pulses for transmitting information signals related to the amplitude of each pulse of said train of pulses over said communication medium.

References Cited

UNITED STATES PATENTS 3,261,919 7/1966 Aaron et al. ---------- 179—15

JOHN W. CALDWELL, *Acting primary Examiner.*

ROBERT L. CALDWELL, *Examiner.*